June 27, 1950 A. C. PARLINI ET AL 2,513,102
VIEWER
Filed June 6, 1946 4 Sheets-Sheet 2
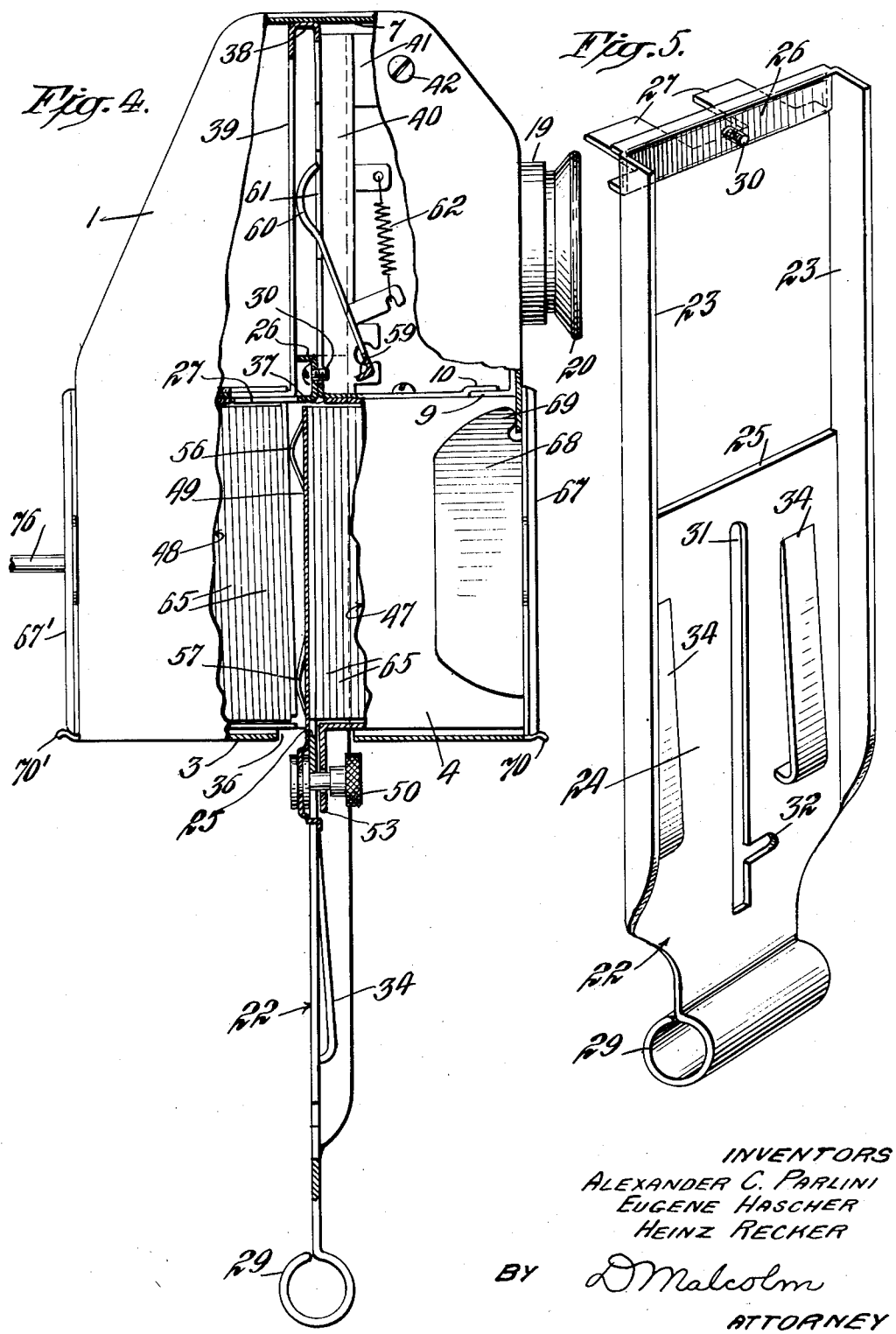
INVENTORS
ALEXANDER C. PARLINI
EUGENE HASCHER
HEINZ RECKER
BY D. Malcolm
ATTORNEY

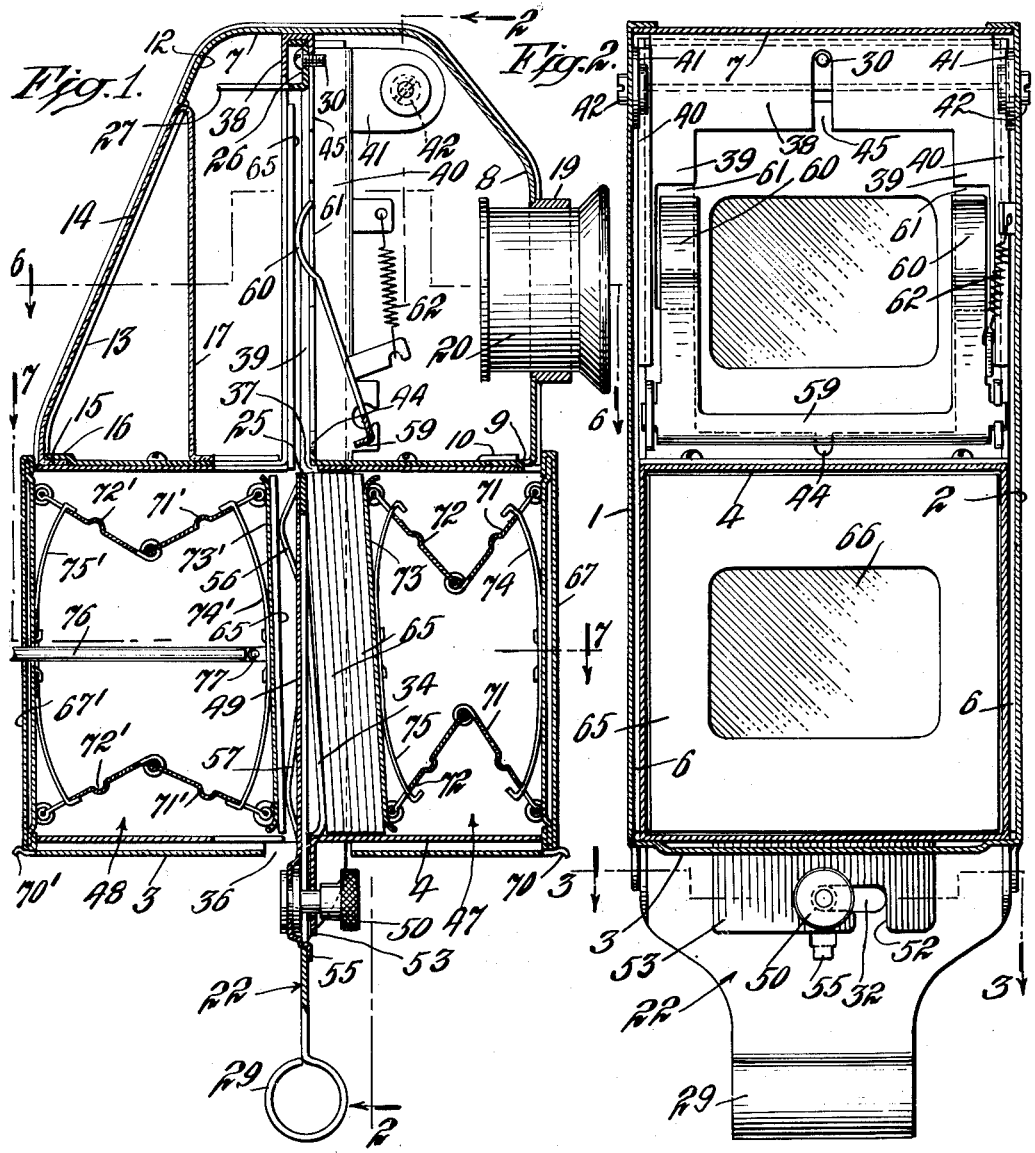

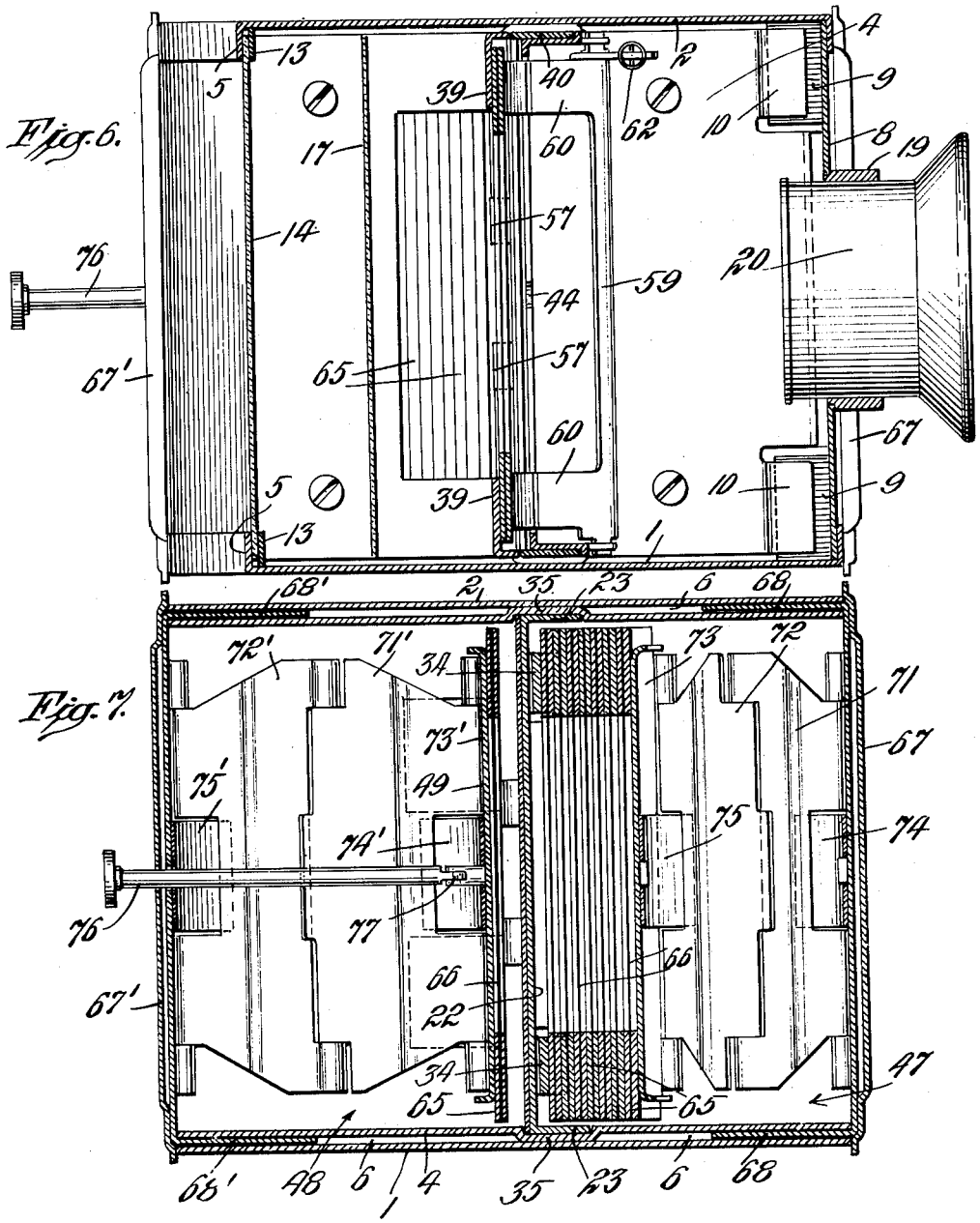

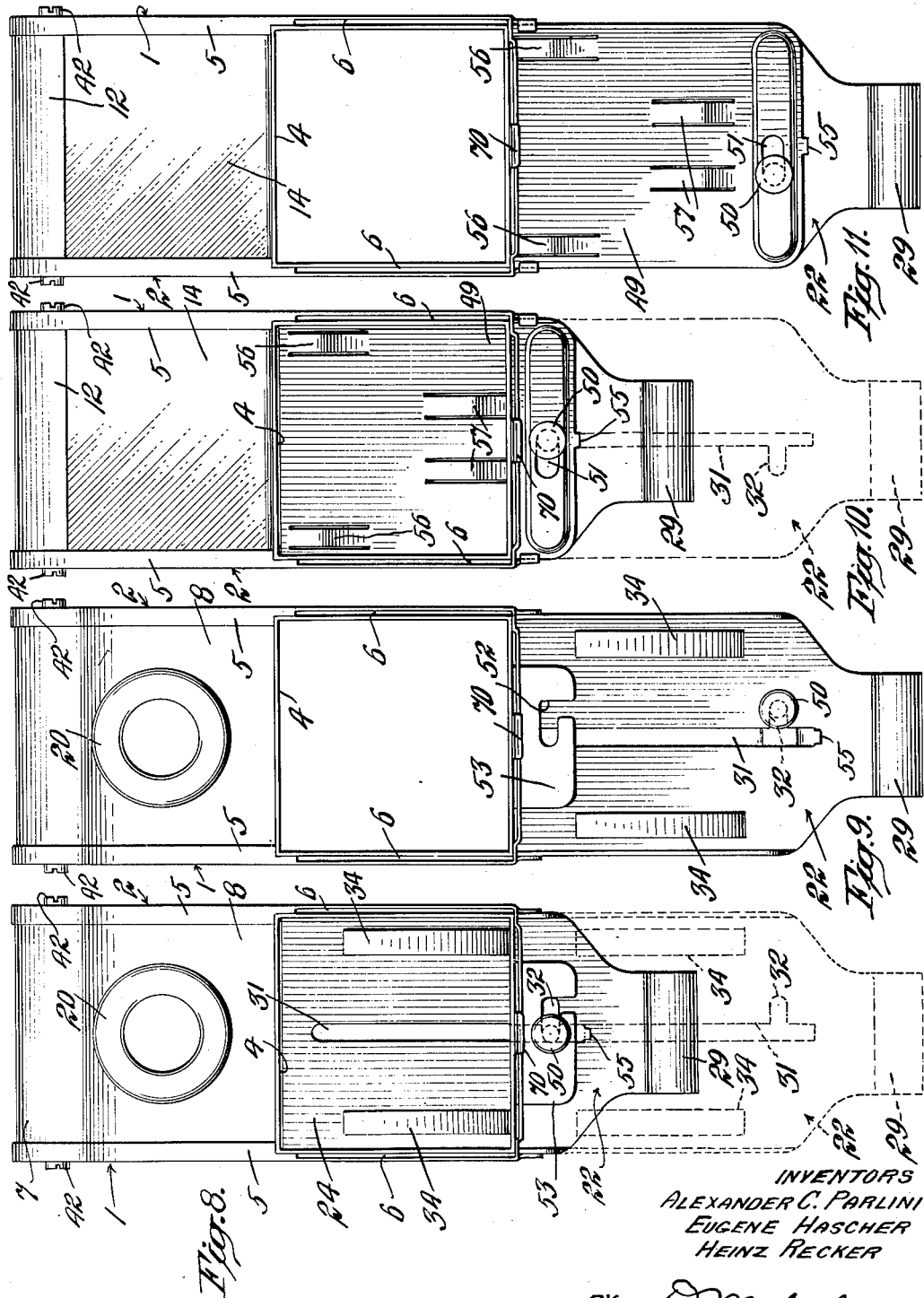

Patented June 27, 1950

2,513,102

UNITED STATES PATENT OFFICE 2,513,102

VIEWER

Alexander C. Parlini, Freeport, N. Y., and Eugene Hascher, Irvington, and Heinz Recker, Ridgewood, N. J., assignors to Empire State Laboratories, New York, N. Y., a partnership Application June 6, 1946, Serial No. 674,796

14 Claims. (Cl. 40—79)

This invention relates to apparatus for viewing pictures such as positive transparencies, either in color or in black and white, and it has for its object to provide a novel and improved instrument for this purpose.

Another object of the invention is to provide a picture or transparency viewer which is adapted to receive a plurality of pictures in a single loading, and to present them successively to view by a simple manual operation by the user.

Another object is to provide a viewer of the above type having a magazine which holds a stack of separate pictures, a manually operated slide which selects the pictures from the magazine and presents them to the optical viewing glass in predetermined sequence, and a storage compartment which receives the viewed pictures from the slide and from which the pictures may either be removed or else shifted en masse to the magazine for re-exhibiting in the same sequence as before.

Still another object is to provide a light, portable viewing instrument of the foregoing type having novel and improved details of construction and features of operation.

Various other objects and advantages will be apparent as the nature of the invention is more fully disclosed.

As is well known, various types of transparent photographs, usually in color, are customarily framed in cardboard mounts, and the usual method of exhibiting such transparencies is to insert them, one at a time, into a "viewer" containing an eyepiece or lens through which the picture can be viewed when the instrument is held up to the light.

Our improved viewer, on the other hand, holds a large number of pictures, which are stacked therein like a deck of cards, and a manually operated reciprocating slide selects said pictures one by one, presents them individually to view, and then conveys each viewed picture to a storage compartment where it is automatically stacked with the preceding pictures in the same position which it occupied in the original stack.

When all the pictures in our instrument have been viewed, they may either be removed and replaced with a new batch, or else they may be shifted as a unit from the storage compartment back into the supply compartment or magazine and then reexhibited in the same manner and sequence as before. Such shifting is accomplished by a simple manual operation which opens a partition between the storage and supply compartments and enables the stack of pictures to be returned to the original starting position, which is especially desirable when a series of pictures is to be viewed by two or more people for educational or entertainment purposes.

A particular advantage of the invention is that it enables a plurality of pictures to be viewed in any desired group or sequence, simply by rearranging or replacing individual pictures, which would be impossible if the pictures were permanently secured together as in a reel or lantern slide.

Although the novel features which are characteristic of this invention are set forth more in detail in the claims appended hereto, the nature and scope of the invention may be better understood by referring to the following description, taken in connection with the accompanying drawings forming a part thereof; in which a specific embodiment has been set forth for purposes of illustration.

In the drawings:

Fig. 1 is a vertical sectional view through a portable viewer embodying the invention, showing the interior of the instrument as viewed from the side;

Fig. 2 is a vertical section taken on line 2—2 of Fig. 1, showing the upper viewing chamber and the lower picture supply compartment;

Fig. 3 is a transverse section taken on line 3—3 of Fig. 2;

Fig. 4 is a broken side view of the instrument, partly in section, with the picture slide in the "down" position;

Fig. 5 is a perspective view of the picture slide;

Fig. 6 is an enlarged transverse sectional view taken on line 6—6 of Fig. 1;

Fig. 7 is an enlarged transverse sectional view taken on line 7—7 of Fig. 1;

Fig. 8 is a front view of the instrument with the cover of the picture supply compartment removed, and with the slide in raised position;

Fig. 9 is a view similar to Fig. 8 but with the slide and the partition between the supply and the storage compartments both in the "down" position;

Fig. 10 is a rear view of the instrument with the parts in the same position which they occupy in Fig. 8; and Fig. 11 is a rear view with the parts in the same position which they occupy in Fig. 9.

The instrument shown in the drawings comprises a casing having side walls 1 and 2 and a bottom wall 3 which, in the embodiment illustrated, are stamped from a single piece of light sheet metal.

A four-walled frame 4, resembling a rectangular box without any ends, lines the lower half of the casing. This frame 4 is held inside the casing by the flanged edges 5 of side walls 1 and 2, as best shown in Figs. 8 to 11, and at the same time the lower portions of these flanged edges 5 are cut away to form slots 6 between the sides of frame 4 and the side walls 1 and 2 of the casing, the purpose of which will be hereinafter described.

The top half of the instrument, which is the portion above the roof of the box-like frame 4, is closed by a hood 7 which is clamped between the flanged edges 5 of side walls 1 and 2 and forms the picture viewing chamber. The front wall 8 of hood 7 has a pair of in-turned tabs 9 which engage beneath tabs 10 integral with frame 38 on the roof of the frame 4, as shown in Figs. 4 and 6. The rear wall 12 of hood 7 is cut away to provide a rectangular window, leaving only the narrow side portions 13 as shown in Figs. 1 and 6, and a translucent light-diffusing window 14 is clamped between said side portions 13 and the flanged edges 5 of side walls 1 and 2. The lower edge of window 14 is turned inwardly at 15 and engaged beneath a tab 16 integral with frame 38 on the roof of frame 4, as shown in Fig. 1. Also, in order to insure proper light diffusion and avoid the formation of shadows, we provide an inner diffusing pane 17 which may be integral with the window 14 and preferably extends downwardly from the top of window 14 to the roof of frame 4 in a plane parallel to the front wall 8 of hood 7.

The front wall 8 of hood 7 has a cylindrical flange 19 containing a slidable eyepiece or lens 20 which may be adjusted in order to obtain the proper focus in viewing the pictures, as hereinafter more fully described. For the sake of simplicity we have illustrated the invention as applied to a two-dimensional viewer and we have therefore shown a single eyepiece 20, although it will be understood that the device may be adapted for three-dimensional viewing by providing suitable stereoscopic eyepieces. In the latter case, of course, it will be understood that duplicate pictures will be used on each film as in a lenticular stereoscope, instead of the single pictures which we employ herein for the two-dimensional viewer.

We shall now describe the reciprocating picture slide 22 which is shown in detail in Fig. 5, after which we shall describe the manner in which said slide is mounted in the instrument, and its operation. The slide 22, which may be stamped out of sheet metal, has side flanges 23 extending from the top of the slide to a point adjacent the bottom thereof, a flat surface 24 extending about half way up the slide and terminating in a horizontal ledge 25, and a top bar or cross-piece 26 having rearwardly extending tabs or fingers 27. The rectangular space bounded by the ledge 25, top bar 26 and flanges 23 is open and is the same width and height as the box-like frame 4 in the bottom of the instrument.

A finger piece or handle 29 is formed on the lower end of the slide 22 for actuating same. A stop pin 30 is carried by the top bar 26 of the slide for the purpose of limiting both the upward and downward movement of the slide, as hereinafter described. The flat surface 24 of the slide contains an elongated longitudinal slot 31 having a short transverse branch slot 32 adjacent the lower end thereof. The front of surface 24 also contains a pair of elongated tapered or wedge-shaped ridges 34, the upper ends of which lie substantially flush with the surface 24 and the lower ends of which are raised above said surface.

The picture slide 22 is slidably mounted in the instrument in the following manner: the vertical side walls of the box-like frame 4 contain guide grooves 35 which are just wide enough to receive the side flanges 23 of slide 22 (Fig. 7); and the base and roof of frame 4 contain transverse openings 36 and 37, respectively (Figs. 1 and 4), through which the slide 22 extends when the side flanges 23 thereof are seated in the grooves 35. Secured to the roof of frame 4 is a skeleton frame 38 having picture guiding channels 39 and longitudinal side rails 40. The rails 40 constitute upper extensions of the grooves 35, so that the grooves 35 and side rails 40 together constitute tracks in which the slide 22 may be moved up and down by means of the handle 29. The rails 40 have lateral ears 41, and screws 42 secure the side walls 1 and 2 of the instrument casing to said ears 41, thus at the same time clamping the hood 7 of the instrument between the flanged edges 5 of said side walls 1 and 2.

The lower edge of skeleton frame 38 has a slot 44 (Fig. 2) which is adapted to receive the stop pin 30 on the top bar 26 of slide 22 to limit the downward movement of said slide, while the upper edge of said frame 38 has a slot 45 which is adapted to receive said stop pin 30 to limit the upward movement of the slide. When the slide 22 is at the upper limit of its travel, as in Fig. 2, the rectangular opening in said slide (bounded by ledge 25, top bar 26 and flanges 23, Fig. 5) registers with the corresponding rectangular opening in the skeleton frame 38, thus affording an unobstructed view through the eyepiece 20 to the translucent light-diffusing pane 17 when light is admitted through the window 14.

The picture slide 22 bisects or divides the box-like frame 4 of the instrument into a front compartment 47 which we call the picture magazine or supply compartment, and a rear compartment 48 which we call the picture storage compartment (Figs. 1 and 4). These two compartments 47 and 48 are adapted to be closed off from each other by a slidable partition 49 which is best shown in Figs. 1, 4, 10 and 11. The partition 49, which may be stamped out of sheet metal, carries on its lower end a locking pin 50 which is slidable in a transverse slot 51 in said partition and also extends through the longitudinal slot 31 in the flat surface 24 of picture slide 22. When partition 49 is fully inserted within the frame 4, so that it completely separates the supply compartment 47 from storage compartment 48, the locking pin 50 enters a notch 52 on a depending ear 53 carried by the bottom of frame 4 of the instrument, thus limiting the upward movement of the partition.

Now, when locking pin 50 is moved transversely in notch 52 to the position shown in Figs. 2 and 8, the pin is locked in the notch and the partition 49 is therefore locked inside the frame 4 where it separates the supply compartment 47 from storage compartment 48, as shown in Figs. 1 and 4. When the parts are in this position, moreover, the locking pin 50 is aligned with the longitudinal slot 31 in picture slide 22 (see Figs. 8 and 10) hence the slide 22 may be moved freely up and down in the instrument by means of the handle 29. Furthermore, when the slide 22 is moved to its upper limiting position as in Fig. 2, the short branch slot 32 in the surface 24 of said slide will register with the notch 52 in the stationary ear 53 on the bottom of frame 4 of the instrument, enabling the slidable locking pin 50 on partition 49 to be moved transversely (toward the right in Figs. 2 and 3) into the branch slot 32 of the slide 22, thus locking partition 49 and slide 22 together. Then, when the slide 22 is moved downwardly by pulling on its handle 29, it will carry the partition 49 with it; and, when the slide reaches the lower limit of its travel, the partition will be completely withdrawn from the box-like frame 4 of the instrument and the picture magazine 47 will be completely open to the storage compartment 48, as shown in Figs. 9 and 11. In the embodiment illustrated, the lower edge of partition 49 has a small depending lip 55 which tracks in the longitudinal slot 31 in the slide 22 and acts as a stop when it strikes the lower end of said slot. The rear face of the partition 49 has a pair of upper widely spaced and relatively high cams or ridges 56 and a pair of lower closely spaced and relatively low cams or ridges 57 for the purpose of guiding the pictures which are to be stacked in the storage compartment 48 of the instrument, as hereinafter more fully described.

The upper viewing chamber of the instrument, directly above the supply compartment 47, contains a transverse bar 59 which is pivotally mounted in the side rails 40 of the skeleton frame 38 and carries a pair of thin resilient fingers 60 which project into openings 61 in the picture guiding channels 39 of skeleton frame 38. A spring 62 resiliently holds the fingers 60 in the openings 61 (by urging said fingers toward the left in Figs. 1 and 4). Therefore, when a picture is moved upwardly through the guiding channels 39 into the viewing position as shown in Figs. 1 and 2, the fingers 60 projecting through the openings 61 in said channels bear against the picture and urge it against the rear of the channels 39, or to the left in Fig. 1, for a purpose presently to be described.

The pictures to be viewed in our instrument may comprise rectangular cardboard mounts 65 each framing a suitable picture transparency 66, as illustrated in Fig. 2. The cards 65 are of a size to fit conveniently within the picture supply compartment 47 without binding therein. Before the instrument is charged, the partition 49 should be locked in closed position by means of locking pin 50 to separate the supply compartment 47 from storage compartment 48, and the picture slide 22 should be fully retracted within the instrument, as shown in Figs. 1 and 2.

When the parts are in the above-mentioned position, a group of picture cards 65, numbering a dozen or more if desired, are inserted manually into the supply compartment 47 where they are stacked on end like a deck of cards, as shown in Fig. 1. The cards are stacked right side up, in precisely the same position in which it is desired to view the pictures, and they are arranged in the order in which they are to be viewed, the first picture to be viewed being inserted first, and so on.

After the cards are inserted in the supply compartment 47, the front of said compartment is closed by a cover 67 having thin side flanges or tongues 68 which engage in the slots 6 between the sides of the frame 4 and the side walls 1 and 2 of the casing. As shown in Fig. 4, the flanges 68 may have upper notched portions or lips 69 which engage beneath a ledge of the casing, and the bottom edge of the cover 67 may engage a spring clip 70 on the bottom wall 3 of the casing to snap the cover in closed position. The inner face of cover 67 carries a spring which is adapted to bear with substantially uniform pressure against the stacked cards 65 in the supply compartment 47, and for purposes of illustration we have shown a bellows type spring comprising two pairs of pivoted leaves 71 and 72 the former of which are pivoted to the inside of cover 67 and the latter of which are pivoted to a flat plate 73 which is adapted to bear against the stack of picture cards in compartment 47. Arched leaf springs 74 and 75, secured to cover 67 and plate 73, respectively, and bearing on the respective pivoted leaves 71 and 72, exert a uniform pressure on all parts of the plate 73 which maintains the cards 65 in the proper position and prevents them from binding in the compartment 47.

The storage compartment 48 of the instrument has a cover 67' which is substantially identical with the cover 67 of supply compartment 47, hence the corresponding parts of the cover 67' and associated elements are identified in the drawing by similar reference numerals but with primes affixed thereto. In the case of cover 67' of storage compartment 48, however, a slidable push rod or plunger 76 extends freely through a small hole in the cover and is pivoted at 77 to the flat plate 73' for the purpose of pushing picture cards 65 from storage compartment 48 back into the supply compartment 47, as hereinafter more fully described.

Assuming now that the instrument is empty, that the covers 67 and 67' are closed, that the partition 49 is locked in closed position by locking pin 50, and that the picture slide 22 is fully retracted as in Figs. 1 and 2, the operation of the device is as follows:

The cover 67 is removed from the compartment 47 and the stacked picture cards 65 to be viewed are inserted manually into the supply compartment as previously described, after which the cover 67 is snapped back in place. The instrument is now ready for use.

The person who wishes to view the pictures simply holds the instrument in one hand and, grasping the handle 29 of slide 22 with the other hand, pulls said slide down to the lower limit of its travel as indicated in Fig. 4. This brings the ledge 25 of slide 22 slightly below the floor of the compartment 47 (Fig. 4) and, since the surface 24 of slide 22 is now withdrawn from compartment 47, the spring-pressed plate 73 of cover 67 forces the stack of cards 65 to the left in Figs. 1 and 4 so that the innermost card 65 is held flat against the partition 49 and directly above the ledge 25 of slide 22.

The operator now pushes the slide 22 all the way into the instrument, and, in so doing, the ledge 25 of slide 22 ascends directly beneath the bottom edge of the innermost card 65 and conveys said card upwardly into the picture guiding channels 39 where it reposes in the field of vision of the eyepiece 20, as shown in Fig. 1. Now, with the translucent window 14 facing the light, and with the adjustable eyepiece 20 properly focused, the operator may view the picture transparency 66 which is mounted on the card 65 thus presented for inspection.

It will be noted that during the ascent of the slide 22 just described, the wedges 34 on the surface 24 of said slide force the remaining stack of cards 65 in compartment 47 to tip slightly at an angle, as shown in Fig. 1, and thus prevent the next innermost card from catching on the card which is in the process of being elevated. The pressure pad 73, because of its universal linkage, continues to hold the upper edge of the next innermost card 65 against the ascending card thereby keeping the latter positively on ledge 25 of slide 22. Furthermore, when the elevated card 65 reaches the viewing position in the guiding channels 39 as just described, the spring-pressed fingers 60 bear against said card and hold it against the rear of said channels as shown in Fig. 1. In this position the card 65 under view is directly above the storage compartment 48, that is, the card has been shifted to the left of the plane of partition 49 as viewed in Fig. 1, and it is now in position to be lowered into the storage compartment 48.

The operator now pulls the slide 22 all the way down, and, in so doing, the rearwardly extending tabs or fingers 27 on the top of slide 22 engage the top edge of the card 65 which has just been viewed and convey said card downwardly into the storage compartment 48. Fig. 1 shows a single card 65 stored in the compartment 48, same being sandwiched between the flat plate 73' and the cams 56 and 57 of partition 49. Now, when a succeeding card 65 descends into storage compartment 48, it will enter the wide space created by cams 56 between the pressure pad 73' or the preceding card 65 and partition 49. The lower cams 57 are spaced close together as shown in Fig. 11, to provide support specifically for the weak portion of card 65 which forms the lower edge of the picture frame. This support is important as it prevents said edge from bulging towards partition 49 and interfering with the bottom edge of the descending card 65. Avoidance of such interference is further favored by the ample space between preceding card 65 and partition 49. The bottom edge of the descending card 65 touches the slope of cam 57 only after it has moved well past the lower picture frame edge of the preceding card 65. As the viewed cards accumulate in storage compartment 48 it will be noted that they are stacked in the same order which they originally occupied in the supply compartment 47.

The operator continues to actuate the slide 22 in order to view succeeding pictures through the eyepiece 20, until finally the supply compartment 47 is empty and all the cards 65 are stacked in the storage compartment 48. Then, if desired, the cards may be removed from the storage compartment and a new batch of different picture cards inserted in compartment 47 for viewing purposes.

On the other hand, if it is desired to view the same pictures again, the operator simply shifts the locking pin 50 of partition 49 to the right as viewed in Fig. 2 in order to lock partition 49 to slide 22, and he then pulls the slide down to the bottom position as shown in Figs. 9 and 11, thus withdrawing both the slide and the partition and opening the supply compartment 47 to the storage compartment 48. The push rod 76 is now forced in (to the right as viewed in Figs. 1, 4 and 7) causing the plate 73' to push the stack of cards 65 out of storage compartment 48 and into supply compartment 47. The cover 67 of the magazine should be removed during this shifting operation to facilitate the entry of the cards into the compartment 47. After the shifting operation the slide 22 is pushed back into the instrument, thus returning partition 49 to the position shown in Fig. 1, after which locking pin 50 is returned to the position shown in Figs. 2, 8 and 10, and the cover 67 is snapped back in place to close the magazine. The instrument is now ready for operation as previously described.

Although a specific embodiment has been shown and described herein for purposes of illustration, it will be evident to those skilled in the art that the invention is capable of various modifications and adaptations within the scope of the appended claims.

The invention claimed is:

1. A device for viewing pictures comprising a casing including a picture supply compartment and an adjoining picture storage compartment adapted to hold stacks of pictures, a movable partition between said compartments, a slide in said casing on the supply compartment side of said partition, means for selectively securing said partition to said casing to separate said compartments from each other, and to said slide for withdrawing said partition from between said compartments, means on said slide engageable with a picture in said supply compartment for moving such picture outwardly to a viewing position outside said compartments, and means on said slide for moving a picture inwardly behind said partition and into said storage compartment upon inward movement of said slide.

2. A device for viewing pictures comprising a casing, an open ended frame in said casing, a picture viewing chamber in said casing outside said frame, a movable partition in said frame dividing same into a picture supply compartment and an adjoining picture storage compartment, a slide in said casing on the supply compartment side of said partition, picture guides in said viewing chamber, means on said partition selectively engageable with said casing to lock said partition in closed position and with said slide to lock said partition to said slide for withdrawing said partition from between said compartments, means on said slide engageable with a picture in said supply compartment for moving such picture outwardly along said partition and into viewing position in said guides, and means on said slide engageable with a picture in said guides to move same inwardly behind said partition and into said storage compartment upon inward movement of said slide.

3. A device for viewing pictures comprising a casing containing a picture supply compartment and an adjoining picture storage compartment adapted to hold stacks of pictures, a movable partition between said compartments, a reciprocating slide in said casing on the supply compartment side of said partition, means for selectively securing said partition to said casing to lock said partition in closed position and to said slide for withdrawing said partition from between said compartments, means on said slide engageable with a picture in said supply compartment for moving such picture upwardly along said partition and into a viewing position outside said compartments, and means on said slide for moving a picture downwardly behind said partition and into said storage compartment upon descent of said slide.

4. A device for viewing pictures comprising a casing, an open ended frame in said casing, a picture viewing chamber in said casing above said frame, a movable partition in said frame dividing same into a picture supply compartment and an adjoining picture storage compartment, a reciprocating slide in said casing on the supply compartment side of said partition, picture guides in said viewing chamber, means on said partition selectively engageable with said casing to lock said partition in closed position and with said slide to lock said partition to said slide for withdrawing said partition from between said compartments, means on said slide engageable with a picture in said supply compartment for moving such picture upwardly along said partition and into viewing position in said guides, means in said casing for viewing a picture held in said viewing position, and means on said slide engageable with a picture in said guides to move same downwardly behind said partition and into said storage compartment upon descent of said slide.

5. A device for viewing pictures comprising a casing, an open ended frame in said casing having openings in the top and bottom thereof, a picture viewing chamber in said casing above said frame, a movable partition in said frame dividing same into a picture supply compartment and an adjoining picture storage compartment, a reciprocating slide in said casing movable through said openings and positioned on the supply compartment side of said partition, picture guides in said viewing chamber above said openings, means on said partition selectively engageable with said casing to lock said partition in closed position and with said slide to lock said partition to said slide for wthdrawing said partition from between said compartments, means on said slide engageable with a picture with said partition for moving such picture upwardly along said partition and into viewing position in said guides, means in said casing for viewing a picture held in the aforesaid viewing position, and means on said slide engageable with a picture in said guides to move same downwardly behind said partition and into said storage compartment upon descent of said slide.

6. A device for viewing pictures comprising a casing, an open ended frame in said casing having openings in the top and bottom thereof, a picture viewing chamber in said casing above said frame, a movable partition in said frame dividing same into a picture supply compartment and an adjoining picture storage compartment, means in said compartments for urging pictures therein toward said partition, a reciprocating slide in said casing movable through said openings and positioned on the supply compartment side of said partition, picture guides in said viewing chamber above said openings, means on said partition selectively engageable with said casing to lock said partition in closed position and with said slide to lock said partition to said slide for withdrawing said partition from between said compartments, means on said slide engageable with a picture in contact with said partition for moving such picture upwardly along said partition and into viewing position in said guides, means in said casing for viewing a picture held in the aforesaid viewing position, and means on said slide engageable with a picture in said guides to move same downwardly behind said partition and into said storage compartment upon descent of said slide.

7. A device for viewing pictures comprising a casing, an open ended frame in said casing having openings in the top and bottom thereof, a picture viewing chamber in said casing above said frame, a movable partition in said frame dividing same into a picture supply compartment and an adjoining picture storage compartment, means in said compartments for urging pictures therein toward said partition, a reciprocating slide in said casing movable through said openings and positioned on the supply compartment side of said partition, picture guides in said viewing chamber above said openings, means on said partition selectively engageable with said casing to lock said partition in closed position and with said slide to lock said partition to said slide for withdrawing said partition from between said compartments, means on said slide engageable with a picture in contact with said partition for moving such picture upwardly along said partition and into viewing position in said guides, means in said casing for viewing a picture held in the aforesaid viewing position, means cooperating with said guides to force a picture rearwardly in said guides of the planes of said slide and said partition, and means on said slide engageable with a picture in said guides to move same downwardly behind said partition and into said storage compartment upon descent of said slide.

8. A device for viewing pictures comprising a casing, an open ended box-like frame in said casing having openings in the top and bottom thereof, a picture viewing chamber in said casing above said frame, a movable partition in said frame dividing same into a front picture supply compartment and an adjoining rear picture storage compartment, covers for closing the outer ends of said compartments, means associated with said covers for urging pictures in said compartments toward said partition, a reciprocating slide in said casing movable through said openings and positioned on the supply compartment side of said partition, picture guiding channels in said viewing chamber aligned with said openings, locking means on said partition selectively engageable with said casing to lock said partition in closed position and with said slide to lock said partition to said slide for withdrawing said partition from between said compartments, means on said slide engageable with a picture in contact with said partition for moving such picture upwardly along said partition and into viewing position in said guiding channels, means in said casing for viewing a picture held in the aforesaid viewing position, means cooperating with said guiding channels to force a picture rearwardly in said channels out of the planes of said slide and said partition, and means on said slide engageable with a picture in said guiding channels to move same downwardly behind said partition and into said storage compartment upon descent of said slide.

9. A device for viewing pictures comprising a casing, an open ended box-like frame in said casing having transverse openings in the top and bottom adjacent the center thereof, a picture viewing chamber in said casing above said frame, a movable transverse partition adjacent the center of said frame dividing same into a front picture supply compartment and an adjoining rear picture storage compartment, covers for closing the outer ends of said compartments, means carried by said covers for urging pictures in said compartments toward said partition, a reciprocating slide in said casing movable through said transverse openings and positioned on the supply compartment side of said partition, a skeleton frame in said viewing chamber having tracks for guiding said slide and picture guiding channels aligned with said transverse openings, locking means on said partition selectively engageable with said casing to lock said partition in closed position and with said slide to lock said partition to said slide for withdrawing said partition from between said compartments, means on said slide engageable with a picture in contact with said partition for moving such picture upwardly along said partition and into viewing position in said guiding channels, an eyepiece in said casing for viewing a picture held in the aforesaid viewing position, means cooperating with said guiding channels to force a picture rearwardly in said channels out of the planes of said slide and said partition, and means on said slide engageable with a picture in said guiding channels to move same downwardly behind said partition and into said storage compartment upon descent of said slide.

10. A device for viewing pictures comprising a casing, an open ended box-like frame in said casing having transverse openings in the top and bottom adjacent the center thereof, a picture viewing chamber in said casing above said frame, a movable transverse partition adjacent the center of said frame dividing same into a front picture supply compartment and an adjoining rear picture storage compartment, covers for closing the outer ends of said compartments, means carried by said covers for urging pictures in said compartments toward said partition, a reciprocating slide in said casing movable through said transverse openings and positioned on the supply compartment side of said partition, a skeleton frame in said viewing chamber having tracks for guiding said slide and pictures guiding channels aligned with said transverse openings, a locking pin on said partition selectively engageable with said casing to lock said partition in closed position and with said slide to lock said partition to said slide for withdrawing said partition from between said compartments, a ledge on said slide engageable with a picture in contact with said partition for moving such picture upwardly along said partition and into viewing position in said picture guiding channels, a light diffusing window and an eyepiece in said viewing chamber on opposite sides of said skeleton frame for viewing a picture held in the aforesaid viewing position, spring fingers in said viewing chamber engageable with a picture in said guiding channels to force same rearwardly in said channels out of the planes of said slide and said partition, and means on said slide engageable with the top of a picture in said guiding channels to move same downwardly behind said partition and into said storage compartment upon descent of said slide.

11. A device for viewing pictures comprising a casing, an open ended box-like frame in said casing having transverse openings in the top and bottom adjacent the center thereof, a picture viewing chamber in said casing above said frame, a movable transverse partition adjacent the center of said frame dividing same into a front picture supply compartment and an adjoining rear picture storage compartment, covers for closing the outer ends of said compartments, spring-pressed plates carried by the inner sides of said covers for urging pictures in said compartments toward said partition, a reciprocating slide in said casing movable through said transverse openings and positioned on the supply compartment side of said partition, a skeleton frame in said viewing chamber having tracks for guiding said slide and picture guiding channels aligned with said transverse openings, a flat surface on said slide containing an elongated longitudinal slot and a shorter transverse branch slot adjacent the outer end thereof, a locking pin on said partition tracking in said longitudinal slot and selectively engageable with said casing to lock said partition in closed position and with the branch slot in said slide to lock said partition to said slide for withdrawing said partition from between said compartments, a ledge on said slide engageable with a picture in contact with said partition for moving such picture upwardly along said partition and into viewing position in said picture guiding channels, a light diffusing window and an eyepice in said viewing chamber on opposite sides of said skeleton frame for viewing a picture held in the aforesaid viewing position, spring fingers in said viewing chamber engageable with a picture in said guiding channels to force same rearwardly in said channels out of the planes of said slide and said partition, and rearwardly projecting tabs adjacent the top of said slide engageable with the top of a picture in said guiding channels to move same downwardly behind said partition and into said storage compartment upon descent of said slide.

12. A device for viewing pictures comprising a casing, an open ended box-like frame in said casing having transverse openings in the top and bottom adjacent the center thereof, a picture viewing chamber in said casing above said frame, a movable transverse partition adjacent the center of said frame dividing same into a front picture supply compartment and an adjoining rear picture storage compartment, covers for closing the outer ends of said compartments, spring-pressed plates carried by the inner sides of said covers for urging pictures in said compartments toward said partition, a reciprocating slide in said casing movable through said transverse openings and positioned on the supply compartment side of said partition, a skeleton frame in said viewing chamber having tracks for guiding said slide and picture guiding channels aligned with said transverse openings, a flat surface on said slide containing an elongated longitudinal slot and a shorter transverse branch slot adjacent the outer end thereof, a locking pin on said partition tracking in said longitudinal slot and selectively engageable with said casing to lock said partition in closed position and with the branch slot in said slide to lock said partition to said slide for withdrawing said partition from between said compartments, a ledge on said slide engageable with a picture in contact with said partition for moving such picture upwardly along said partition and into viewing position in said picture guiding channels, a light diffusing window and an eyepiece in said viewing chamber on opposite sides of said skeleton frame for viewing a picture held in the aforesaid viewing position, spring fingers in said viewing chamber engageable with a picture in said guiding channels to force same rearwardly in said channels out of the planes of said slide and said partition, rearwardly projecting tabs adjacent the top of said slide engageable with the top of a picture in said guiding channels to move same downwardly behind said partition and into said storage compartment upon descent of said slide, and means in said storage compartment for returning stored pictures to the adjoining supply compartment when said compartments are connected by the withdrawal of said partition.

13. A device for viewing pictures comprising a casing, an open ended box-like frame in said casing having transverse openings in the top and bottom adjacent the center thereof, a picture viewing chamber in said casing above said frame, a movable transverse partition adjacent the center of said frame dividing same into a front picture supply compartment and an adjoining rear picture storage compartment, covers for closing the outer ends of said compartments, spring-pressed plates carried by the inner sides of said covers for urging pictures in said compartments toward said partition, a reciprocating slide in said casing movable through said transverse openings and positioned on the supply compartment side of said partition, a skeleton frame in said viewing chamber having tracks for guiding said slide and picture guiding channels aligned with said transverse openings, a flat surface on said slide containing an elongated longitudinal slot and a shorter transverse branch slot adjacent the outer end thereof, a locking pin on said partition tracking in said longitudinal slot and selectively engageable with said casing to lock said partition in closed position and with the branch slot in said slide to lock said partition to said slide for withdrawing said partition from between said compartments, a ledge on said slide engageable with a picture in contact with said partition for moving such picture upwardly along said partition and into viewing position in said picture guiding channels, means on the flat surface of said slide for tipping pictures in said supply compartment away from said surface during the ascent of said slide, a light diffusing window and an eyepiece in said viewing chamber on opposite sides of said skeleton frame for viewing a picture held in the aforesaid viewing position, spring fingers in said viewing chamber engageable with a picture in said guiding channels to force same rearwardly in said channels out of the planes of said slide and said partition, rearwardly projecting tabs adjacent the top of said slide engageable with the top of a picture in said guiding channels to move same downwardly behind said partition and into said storage compartment upon descent of said slide, means on the rear side of said partition for guiding descending pictures into said storage compartment, and means in said storage compartment for returning stored pictures to the adjoining supply compartment when said compartments are connected by the withdrawal of said partition.

14. A device for viewing pictures comprising a casing, an open ended box-like frame in said casing having transverse openings in the top and bottom adjacent the center thereof, a picture viewing chamber in said casing above said frame, a movable transverse partition adjacent the center of said frame dividing same into a front picture supply compartment and an adjoining rear picture storage compartment, covers for closing the outer ends of said compartments, spring-pressed plates carried by the inner sides of said covers for urging pictures in said compartments toward said partition, a reciprocating slide in said casing movable through said transverse openings and positioned on the supply compartment side of said partition, a skeleton frame in said viewing chamber having tracks for guiding said slide and picture guiding channels aligned with said transverse openings, a flat surface on said slide containing an elongated longitudinal slot and a shorter transverse branch slot adjacent the outer end thereof, a locking pin on said partition tracking in said longitudinal slot and selectively engageable with said casing to lock said partition in closed position and with the branch slot in said slide to lock said partition to said slide for withdrawing said partition from between said compartments, a ledge on said slide engageable with a picture in contact with said partition for moving such picture upwardly along said partition and into viewing position in said picture guiding channels, wedges on the flat surface of said slide for tipping pictures in said supply compartment away from said surface during the ascent of said slide, a light diffusing window and an eyepiece in said viewing chamber on opposite sides of said skeleton frame for viewing a picture held in the aforesaid viewing position, spring fingers in said viewing chamber engageable with a picture in said guiding channels to force same rearwardly in said channels out of the planes of said slide and said partition, rearwardly projecting tabs adjacent the top of said slide engageable with the top of a picture in said guiding channels to move same downwardly behind said partition and into said storage compartment upon descent of said slide, cams on the rear side of said partition for guiding descending pictures into said storage compartment, and a slidable plunger extending through the cover of said storage compartment and secured to the spring-pressed plate therein for returning stored pictures from said storage compartment to the adjoining supply compartment when same are connected by the withdrawal of said partition.

ALEXANDER C. PARLINI.
EUGENE HASCHER.
HEINZ RECKER.

REFERENCES CITED

The following references are of record in the file of this patent:

UNITED STATES PATENTS

| Number | Name | Date |
|---|---|---|
| 375,326 | Munroe | Dec. 20, 1887 |
| 1,016,677 | Dannheiser | Feb. 6, 1912 |
| 1,159,681 | Kastner | Nov. 9, 1915 |
| 1,437,112 | Lepine | Nov. 28, 1922 |